United States Patent [19]
Leclair
[11] 3,816,139
[45] June 11, 1974

[54] THERMOGRAPHIC COPY SHEET CONTAINING PHTHALIMIDE

[75] Inventor: Albert W. Leclair, Hudson, N.H.
[73] Assignee: Nashua Corporation, Nashua, N.H.

[22] Filed: Apr. 13, 1970
[21] Appl. No.: 28,068

[52] U.S. Cl. .................... 96/114.1, 96/67, 117/36.7
[51] Int. Cl. .................... G03c 1/02, G03c 1/76
[58] Field of Search ............ 250/65.1; 96/114.1, 67; 117/36.8, 36.7

[56] References Cited

UNITED STATES PATENTS

| | | | |
|---|---|---|---|
| 3,042,517 | 7/1962 | Wainer | 250/65.1 |
| 3,080,254 | 3/1963 | Grant | 117/36.8 |
| 3,107,174 | 10/1963 | Wartman | 117/36.8 |
| 3,322,557 | 5/1967 | Schwab | 117/36.8 |
| 3,446,648 | 5/1969 | Workman | 117/36.8 |

*Primary Examiner*—Ronald H. Smith
*Assistant Examiner*—M. F. Kelley

[57] ABSTRACT

A thermographic copy sheet is formed with phthalimide toner in combination with a metal salt such as a silver salt, and a material which forms a colored product when reacted with the metal salt.

2 Claims, No Drawings

THERMOGRAPHIC COPY SHEET CONTAINING PHTHALIMIDE

This invention relates to thermographic copying and provides thermographic copy sheets including phthalimide as a toner.

In thermographic copying, heat energy, generally from an infra red source, is utilized to bring about a color-forming reaction in the copy sheet. In one type, the heat sensitive sheet is brought into face to face contact with a graphic original which carries an image formed of heat absorbing material. When these are exposed to infra red radiation, the image portion of the original is selectively heated to cause the development in the adjacent sheet of a color pattern corresponding to the original. In another type, one of the color forming components of the copy sheet is destroyed or otherwise rendered inactive by exposure to short wave length radiation in the portions corresponding to the white, non-image areas, thereafter the application of heat or infra red radiation causes color formation in the image areas. This latter type of system has the advantage that the final copy does not remain heat sensitive, as the reactivity of the system has been destroyed by the short wave length radiation. It is primarily to this type of system that the present invention is directed.

The system of this invention may utilize a single sheet having a coating containing reactive components, one of which is rendered inactive by exposure to short wave length radiation. Known systems of this type are described by Lawton and Lopez, U.S. Pat. No. 3,076,707 and by Grant, U.S. Pat. No. 3,094,619, which utilize color-forming systems employing diazonium compounds and alpha naphthols respectively. In these systems the copy sheet may be exposed to a short wave length, e.g. ultra violet radiation image of the original to be copied, to inactivate all but the unexposed black areas of the copy sheet, and then heated to develop color in the black areas where the components remain reactive. Alternatively, the copy sheet may be initially exposed to infra red radiation while being in contact with the graphic original, to bring about a color-forming reaction in the areas in contact with the black parts of the original, and then subsequently exposed to short wave length radiation to inactivate the unreacted parts of the sheet.

Two-sheet systems are also known, as exemplified by Benbrook, U.S. Pat. No. 2,789,904 and Workman, U.S. Pat. No. 3,094,417, in which the reactant susceptible of being deactivated by exposure to short wave length radiation is carried on a sheet separate from the sheet which carries the material with which it enters into a color forming reaction. In utilizing the two-sheet system, the sheet containing the deactivatable component is first exposed to a short wave radiation image of the original to be copied to cause deactivation of the exposed portions. This sheet is then brought into contact with a sheet containing the other color forming components and heated to bring about a color forming reaction in the unexposed areas. The two-sheet system requires that one of the color forming reactants will transfer when heated from one sheet to the other sufficiently to bring about the color forming reaction.

In either the one-sheet system or the two-sheet system, a toner material can be used in conjunction with color-forming reactants to provide further darkening in the colored areas. While the exact nature of the toner's function is not known, it is believed that it operates to increase the size of the precipitated reduced metal from the reduction reaction to thereby increase image darkness. The images obtained when a toner is used has greatly improved color density as compared to images obtained without toner.

The present invention is based on the discovery that certain phthalimides provide images of increased color density in thermographic systems employing as the color-forming reactants a metal salt and a material which may be rendered thermographically inactive by exposure to short wave length radiation. This invention accordingly provides systems in addition to those previously known for providing permanent heat insensitive copies by thermographic means.

In general the system of this invention utilizes phthalimide, a metal salt and a compound which enters into a color forming reaction with the metal salt. Suitable compounds are those which are rendered thermographically inactive by exposure to short wave length radiation such as the naphthols disclosed by U.S. Pat. No. 3,094,417 to Workman, the pyrazalones disclosed in copending application Ser. No. 805,840 filed Mar. 10, 1969, the acetoacetonitiles disclosed in copending application Ser. No. 805,839 filed Mar. 10, 1969 or any other compounds which react to form a colored product with a metal salt particularly a silver salt. Suitable reactive silver salts are disclosed, for example, in U.S. Pat. No. 3,094,417 as being normally solid organic acid salts of silver, such as silver behenate. The phthalimide can be combined with the metal salt in a suitable binder and applied to a backing sheet of paper or the like. Thus, the metal salt and thermographically desensitizable compound can be coated on the same or separate backing sheet for use in any available copying process and the phthalimide can be employed in the metal salt coating. The binder may be omitted from either or both coatings and the reactants supplied from a solution in a suitable solvent.

The compound reactive with the metal salt can be desensitized by exposure to ultra violet radiation, but may be rendered sensitive to actinic radiation of longer wave length, for instance that from a tungsten filament lamp, by introducing a dye sensitizer in accordance with well known photochemical technology. Dye sensitizers of the erythrosin family have been found to be quite suitable, but others may be used. In addition, the phthalimide of this invention also can be employed in conjunction with other known toner materials or auxiliary reducing agents. Typical examples of thermographic copy systems of this invention are described in the following examples.

EXAMPLE I

The sheet described in this example is useful with a sheet containing a material reactive with a silver salt to produce a colored product and which is desensitized by short wave length radiation. The sheet consists of a bond weight white paper base coated with an ethyl acetate solution of the phthalimide to a coated weight of 6.0 lbs. per 3,000 square feet. A suitable coating composition consists of:

| | Parts by weight |
|---|---|
| Ethyl Acetate | 38.30 |
| Polyvinyl Butyral (Butvar B-79) | 3.00 |

-Continued

| | Parts by weight |
|---|---|
| Silver Stearate | 1.50 |
| Stearic Acid | 0.60 |
| Phthalimide | 0.60 |

applied by a Mayer Rod and coated and dried.

This sheet was heated in contact with a second sheet previously exposed to ultra violet radiation e.g. from an 8 watt "black light bulb (GE F8T5/B1)" to inactivate the exposed "non-image" areas. The second sheet comprised a thin, e.g. glassine, paper prepared as described in Ex. 1 of U.S. Application Ser. No. 805,839, filed Mar. 10, 1969. The resultant image obtained on the white sheet had a greatly improved color density as compared to a sheet formed and exposed in the manner described and not containing the phthalimide.

EXAMPLE II

The phthalimide toner is preferably employed in conjunction with an auxiliary reducing agent. A suitable coating composition consists of:

| | Parts by weight |
|---|---|
| Ethyl Acetate | 38.3 |
| Polyvinyl Butyral (Butvar B-79) | 3.0 |
| Silver Stearate | 1.5 |
| Phthalimide | 0.6 |
| Stearic Acid | 0.2 |
| 2, 6-dicyclohexyl-p-cresol | 0.6 |

applied by a Mayer Rod and coated and dried.

The sheet was heated in contact with a second sheet previously exposed to ultra violet radiation to inactivate the exposed "non-image" areas. The second sheet comprises a thin, e.g., glassine, paper coated with a reducing agent as disclosed in Example I. The resultant image obtained on the white sheet had a greatly improved color density as compared to a sheet formed and exposed in the manner described and not containing the phthalimide.

EXAMPLE III

The phthalimide toner can be employed in conjunction with an auxiliary reducing agent and a filler. A suitable coating composition consists of:

| | Parts by weight |
|---|---|
| Ethyl Acetate | 40.0 |
| Polyvinyl Butyral (Butvar B-76) | 3.0 |
| Silver Stearate | 1.5 |
| Phthalimide | 0.6 |
| Stearic Acid | 0.2 |
| 2, 6-dicyclohexyl-p-cresol | 0.6 |
| Zinc Oxide | 10.0 |

applied by a Mayer Rod and coated and dried to 5.5 pounds per 3,000 $ft.^2$ paper.

The sheet was heated in contact with a second sheet previously exposed to ultra violet radiation to inactivate the exposed "non-image" areas. The second sheet comprises a thin, e.g., glassine, paper coated with a reducing agent disclosed in Example I. The resultant image obtained on the white sheet had a greatly improved color density as compared to a sheet formed and exposed in the manner described and not containing the phthalimide.

I claim:

1. Sheet material containing, in intimate association, a silver salt of an organic acid and a significant small amount of phthalimide.

2. A thermographic element comprising a support, having a layer thereon comprising a binder, a silver salt of an organic acid, and phthalimide.

* * * * *